Patented Sept. 9, 1947

2,427,183

UNITED STATES PATENT OFFICE 2,427,183

ELECTRICAL INSULATION

Kenneth L. Berry, Hockessin, Del., assignor to E. I. du Pont de Nemours & Company, Wilmington, Del., a corporation of Delaware No Drawing. Application October 25, 1943, Serial No. 507,590

9 Claims. (Cl. 154—2.6)

This invention relates to electrical insulation and more particularly to laminated electrical insulation, and to electrical conductors insulated therewith.

In most applications of electrically insulating substances in sheet or tape form such as, for example, the insulation of coils, cables, adjacent commutator segments, etc., it is imperative that the insulation possess good mechanical and dielectric strengths. It is highly desirable that it also be resistant to deleterious effects of high temperatures, moisture, lubricants, oxidizing substances such as ozone and nitrogen oxides, and solvent vapors such as those of hydrocarbons, ketones, alcohols, and dry cleaning compounds. If such insulating materials are to be widely useful, it is also important that they be easily and cheaply manufactured.

Attempts to produce electrical insulation materials which combine the aforementioned characteristics have involved the modification of inorganic substances, such as mica, asbestos, and glass by laminating or filling with organic, thermoplastic resins. For insulation in sheet or tape form, so-called "built-up" or "pasted" mica, i. e., mica flakes cemented together in stratified relation with a suitable binder, commonly have been used. Natural limitations of size and quality have demanded that mica be so prepared in order to extend its utility.

The known binders heretofore employed for cementing together mica splittings have certain disadvantages. The organic resins all have uneconomic life when heated at temperatures above about 125° C. It is this consideration which limits the temperature of use and resulting power handling capacity per unit of size of electrical equipment. Ordinary resins in use at present are also subject to carbonization with resulting loss in insulating value, and most of them lack a high degree of resistance to corrosive or solvent chemicals and to oxidizing gases, such as ozone and nitrogen oxides which are not uncommon around electrical equipment. The inorganic adhesives overcome these difficulties to some extent, but they are glassy, brittle, and inflexible, and for this reason built-up mica sheets manufactured with cements of these materials find limited use, generally only as rigid supports for resistance heaters. A further disadvantage of the built-up mica forms which are presently available is that they fall far short of having dielectric strengths comparable with that of sheet mica. Furthermore, the process of bonding mica with these materials usually includes special laborious techniques for removing gases, whether they be vapors of the binder solvents or decomposition products, such as those which are evolved when shellac is cured at the temperatures necessary to produce a satisfactory product. Alternate heating in a vacuum oven and pressing are necessitated.

Other heat resisting materials, namely, glass and asbestos, have been resorted to in order to provide insulating articles in sheet form having a combination of as many desirable attributes as possible. Glass must necessarily be used in fiber form to achieve flexibility, and asbestos occurs naturally in this form. These fibers are felted, matted, or woven into sheets and tapes. Being porous the articles have low resisitivity and low dielectric strength. They are not very resistant to abrasion, and asbestos listing, particularly, has very little strength. Cotton fibers are ordinarily mixed with asbestos fibers to increase tensile strength, but the qualities of heat resistance and moisture insensitivity are sacrificed. Other methods for improving the properties of glass and asbestos sheetings have involved lamination or impregnation with cellulose derivatives and/or organic resins. Although the mechanical and dielectric strengths and abrasion resistance are increased, the maximum temperature of use is reduced to about 125° C., sensitivity to moisture and solvents is usually increased, and the articles are no longer free from the possibility of charring, burning, or tracking.

As in the process for laminating mica with the aforementioned materials, glass and asbestos fabrics are laminated with paper, a cellulose derivative, or regenerated cellulose (known commercially as "Cellophane") by use of adhesives in solutions of volatile solvents. A time consuming and expensive baking treatment is employed to rid the assembly of solvent.

This invention has as an object the production of electrical insulation in the form of sheets and tapes which have the following combination of attributes: Mechanical strength; flexibility; fireproofness, freedom from charring under the influence of continuous heating or arcing; arc extinguishing properties; high dielectric strength and volume and surface resistivities; resistance to oxidizing substances, such as ozone, nitrogen oxides, nitric acid, etc.; low thermal conductivity; insensitivity to moisture and solvents; utility with economic life at temperatures as high as approximately 300° C. (572° F.); and resistance to practically all chemical substances which do not attack glass. A further object resides in improved electrically insulated conductors and apparatus the insulation of which is composed of the above mentioned sheets and tapes. A still further object is to provide a process for making laminations containing mica, glass, asbestos, or other siliceous materials which have the aforementioned properties. Other objects will appear hereinafter.

The above objects are accomplished by the production of laminations of siliceous material with polytetrafluoroethylene in the manner more particularly pointed out hereinafter which in the preferred embodiment comprises roughening the surface of the siliceous material, bringing the solid polymer into contact with the rough surface, simultaneously heating and subjecting the assembly to pressure followed by heating the article in air at high temperatures and finally cooling the assembled structure very rapidly.

In the best method of carrying out the invention mica flakes or splittings are roughened by grinding them with abrasives between adjacent surfaces. After the abrasive is blown from the mica by an air stream a layer of mica flakes is laid on a flat surface. Finely divided polymer is dusted on and covered with another layer of roughened mica slittings. This process is continued until a stack of the desired thickness is built up. In applying the solid, powdered polymer to the mica, use is made of the fact that the electrostatic charge acquired by agitation of the particles causes them to be more or less uniformly distributed over the surface of the mica. The assembled combination is bonded into a unitary sheet by placing it in a hydraulic press, the plates of which are maintained at 370° to 430° C. and pressing under a pressure of 500 to 1000 lbs./sq. in. After elapse of sufficient time for the lamination to reach the temperature of the press, the sheet is removed and quickly plunged into cold water. Excess polytetrafluoroethylene which has been squeezed from between the mica crystals is trimmed off and used again in the process.

The product thus obtained is a hard, flexible, laminated sheet which contains 1-50% of the polymer, depending on how much was originally applied and the temperature and pressure during bonding. The sheets vary from transparent to opaque, depending on their thickness and the quality of the mica.

The following examples are further illustrative of the practice of this invention.

Example I

The faces of flakes or splittings of white, otherwise known as Indian or muscovite mica, are roughened by rubbing them over each other with a small amount of 200 mesh Carborundum in between. The Carborundum is blown off. A layer of roughened flakes is laid down on a flat surface, finely divided polymer is scattered on the mica, and another layer of mica flakes is superimposed on the polymer. This assembly is placed in an hydraulic press maintained at 400° to 410° C. and a pressure of about 2000 lbs./sq. in. is applied. After the temperature of the mica sandwich is in equilibrium with that of the press plates, the pressure is released and the bonded mica is quickly plunged into ice water. Excess polytetrafluoroethylene which is squeezed out around the edges of the plate is trimmed off and may be used again in the process.

The laminated sheet is colorless and transparent. The thickness of the binder film is approximately 0.0005", and it adheres to the mica with a force considerably greater than that which exists between contiguous flakes or crystals in natural sheet mica. The laminated product has a dielectric strength of 1970 volts per mil, as compared with a value of 1050 volts per mil for shellac bonded mica of the same thickness and under the same testing conditions. Exposing the assembly to air or oil at 300° C. for 10 minutes does not occasion any separation of the laminate nor is there any lateral slippage or discoloration. The resilience and flexibility of the bonding layer and its firm adhesion to the mica permits the assembled sheet to be flexed without flaking. It can also be cleanly cut, punched, stamped, or notched without excessive flaking.

In modifications of the invention illustrated in the subsequent examples other siliceous materials in continuous sheet form, such as glass or fused quartz plates, are after roughing the surface cemented with polytetrafluoroethylene in the same manner as the mica. The bonding of sheets prepared from fibrous materials, such as quartz fibers, felted or matted slag wool, etc., differs in minor details. The rough surface presented by woven or matted sheets of fiber glass and asbestos is sufficient for obtaining bonds of high strength. Although they can be further roughened by abrading the surface these sheets as a rule can be used as manufactured. In laminating such forms, it is preferred that the polytetrafluoroethylene be in the form of prefabricated continuous films. The heating, pressing, and quenching are done the same as in the process for mica.

Example II

Two sheets of felted asbestos paper 0.017" in thickness are sandwiched with a sheet of polytetrafluoroethylene 0.007" thick. This assembly is placed in an hydraulic press at 400° C. and pressed at approximately 1700 lbs./sq. in. until the material reaches the temperature of the press. This requires less than approximately ½ minute. The article is then heated without pressure in air at 430° C. until the reinforcing cotton in the asbestos, which is no longer necessary, is burned out. This requires less than about ½ hour. The hot lamination is plunged into cold water, removed, and dried. The product is white, flexible, and tough. At 300° C. it will not permit passage of fluids, nor does it delaminate. A tape cut from the lamination has a tensile strength 3.3 times that of a tape of felted asbestos having the same dimensions. The dielectric strength is twice as high.

Example III

A tape of polytetrafluoroethylene 0.010" thick and having a width equal to the circumference of #14 (A. W. G.) copper wire is longitudinally folded around such wire by passing the two objects simultaneously through a circular die of the appropriate size. As the wire bearing the polymer film issues from the die it is spirally wrapped with ½" wide glass tape woven from continuous filament glass yarn. This ensemble is immersed in a molten lead bath at 375° C. for about 30 seconds or until temperature equilibrium is assured. In this treatment the polymer is subjected to high pressures by reason of its coefficient of thermal expansion being much larger than that of glass. The coated wire is heated in air at approximately 400° C. until the glass is free of charred sizing, and the assembly is finally passed into cold water. The copper wire, being annealed, is soft, flexible, and has maximum conductivity. The polytetrafluoroethylene is firmly adherent to the wire and conforms minutely and adheres firmly to the rough surface presented by the woven glass surface. The glass cannot therefore be unwound from the coated wire. This laminated insulation has high dielectric strength and is not charred or otherwise destroyed by immersion in mineral oil at 300° C. for 10 minutes. The insulation is unaffected by six hours exposure in ozone of sufficient concentration to destroy rubber in two minutes.

*Example IV*

Thin plates of clear, fused quartz are ground to a satin finish by rubbing together with 200 mesh Carborundum. The Carborundum is replaced with a small amount of polytetrafluoroethylene powder and the sandwich is pressed at 375° C. and a pressure of about 50 lbs./sq. in. In the absence of pressure, the cemented plates are heated to about 425° C. and plunged into cold water. The bonding film, which is about 0.0005" thick, is translucent and firmly adherent to the quartz. The resilience of the cementing stratum is readily apparent when the quartz plates are subjected to a shearing stress.

Although pure polytetrafluoroethylene is preferred in the practice of this invention, material modified as it is for other applications can be used. The polymer can be mixed with other substances in various amounts. Examples of suitable fillers are finely divided non-metallic elements, such as carbon; inorganic oxides, such as titanium dioxide, lead oxides, silicon dioxide, and manganese dioxide; inorganic salts, such as barium sulfate, magnesium carbonate, zinc sulfide, calcium chromate, and barium titanate; and other mineral fillers, such as asbestos, powdered mica, and powdered fuller's earth. Titanium dioxide and the alkaline earth titanates are particularly valuable for raising the dielectric constant of the binder. For certain uses it is advantageous to incorporate finely divided, electrically conducting grains or flakes into the polytetrafluoroethylene. Aluminum, copper, silver, graphite, carbon, etc., are most useful. In some cases, for example, the lamination of asbestos paper, it is desirable to further increase the strength of the product by incorporating reinforcing glass or metal fibers in the polytetrafluoroethylene binder. The polymer may also be modified by copolymerization with another polymerizable organic compound containing an ethylenic double bond, e. g., ethylene, vinyl compounds, methacrylic acid esters, etc., and by polymerization of the tetrafluoroethylene in the presence of hydrocarbons and halogenated hydrocarbons such as butane, isooctane, carbon tetrachloride and chloroform.

The surface of the materials to be bonded with polytetrafluoroethylene may be roughened by grinding or abrading, sandblasting, or etching with hydrogen fluoride. The fabrication of fibrous substances to sheets usually produces a sufficiently rough surface, but it can be further roughened by abrasion. A sandwich prepared by layering the siliceous material with polytetrafluoroethylene in either powder or film form can be cold as well as hot pressed. It is preferred, however, to press simultaneously with heating in the range of 330° to 450° C. Pressures may be in the range 10–5000 lbs./sq. in. or higher, depending upon the equipment available and the type of product desired. Baking of the product is done at temperatures of roughly 400°–500° C. and usually continued until substantially all oxidizable substances have disappeared, and the product is thereby rendered light in color. This process can be accelerated by baking in an atmosphere enriched with oxygen gas added from a storage cylinder or provided by the use of oxygen-liberating substances, such as potassium nitrate. The hot lamination can be quenched by immersion in any cold fluid, gaseous or liquid, or by bringing it into contact with cold surfaces, preferably metallic.

The relative proportions of polytetrafluoroethylene and siliceous material can be varied widely. For example, it is preferred to build up mica using 1–20% by weight of the polymer as the binder, but sheet insulation which is substantially polytetrafluoroethylene can be given a hard surface by pressing on mica splittings by the process of this invention.

The binding stratum of polytetrafluoroethylene need not necessarily be continuous. Sheets of siliceous materials can be "spot welded" to the polymer, or the latter may have a porous structure. These measures offer methods of providing low loss insulation for high frequency equipment. The polymer layer can also be in the form of a fabric manufactured from fibers of the polymer.

The products of this invention find increased utility in all applications where natural sheet- or build-up mica is now employed. For example, they can be used to line armature and field coil slots; insulate commutator segments, make V-rings, coil forms, spacers, supports, bases, sockets, gaskets, spark plug insulation, fuse plug and other safety windows, spark arrestors, arc deflectors, condensers, etc.

Wires insulated with laminations of polytetrafluoroethylene and glass or asbestos are particularly useful in applications where long life, and resistance to heat, oxidation, corrosive conditions, and lubricants are important. Examples of the uses are: Windings for refrigerator and exhaust motors, and motors designed to operate at high temperatures for increased efficiency or because of environmental conditions. The laminations may also be used to manufacture cable spacers, electrical instrument and machine cases, supports in electroplating baths, battery plate separators, etc.

As many apparently widely different embodiments of this invention may be made without departing from the spirit and scope thereof, it is to be understood that I do not limit myself to the specific embodiments thereof except as defined in the appended claims.

I claim:

1. A method for making electrical insulation which comprises applying polytetrafluoroethylene in solid form between layers of siliceous material, bonding the polytetrafluoroethylene and said layers into a unitary laminated structure by subjecting the laminae to heat and pressure, and rapidly cooling the laminated product.

2. A method for making electrical insulation which comprises applying polytetrafluoroethylene in solid form between layers of siliceous material having a roughened surface, bonding the polytetrafluoroethylene and said layers into a unitary laminated structure by subjecting the laminae to pressure at a temperature of from 330° C. to 450° C. and rapidly cooling the laminated product by quenching it in a cooling liquid.

3. A method for making electrical insulation which comprises roughening the surface of mica flakes, arranging the roughened flakes in a layer, applying finely divided polytetrafluoroethylene to said layer, applying over said polytetrafluoroethylene a second layer of the roughened flakes, continuing the application of said flakes and finely divided polytetrafluoroethylene until the desired thickness is obtained, bonding the layers into a unitary laminated structure by subjecting the laminae to pressure at a temperature of from 330° C. to 450° C., and rapidly cooling the laminated product.

4. Insulating material comprising layers of siliceous material bonded together by polytetrafluoroethylene between and adherent to the surfaces of said layers.

5. Insulating material comprising flake mica having roughened surfaces and arranged in layers bonded by polytetrafluoroethylene between said layers and adherent to the roughened surfaces of said layers.

6. The method set forth in claim 1 in which said siliceous material is asbestos paper.

7. The method set forth in claim 1 in which said siliceous material is fiber glass fabric.

8. The insulating material defined in claim 4 in which said siliceous material is asbestos paper.

9. The insulating material defined in claim 4 in which said siliceous material is fiber glass fabric.

KENNETH L. BERRY.

REFERENCES CITED

The following references are of record in the file of this patent:

UNITED STATES PATENTS

| Number | Name | Date |
| --- | --- | --- |
| 2,230,654 | Plunkett | Feb. 4, 1941 |
| 2,325,060 | Ingersoll | July 27, 1943 |
| 1,998,309 | Clark | Apr. 16, 1935 |
| 1,416,036 | Kempton | May 16, 1922 |
| 162,204 | Strickler | Apr. 20, 1875 |
| 2,258,218 | Rochow | Oct. 7, 1941 |
| 1,873,753 | Frederick | Aug. 23, 1932 |

FOREIGN PATENTS

| Number | Country | Date |
| --- | --- | --- |
| 5,892 | Great Britain | 1903 |